(12) United States Patent
Reichelt

(10) Patent No.: US 6,788,884 B2
(45) Date of Patent: Sep. 7, 2004

(54) SPACE HEATING SYSTEM

(75) Inventor: Helmut Reichelt, Reichstadt (DE)

(73) Assignee: Moletherm Holding AG (CH)

( * ) Notice: Subject to any disclaimer, the term of this patent is extended or adjusted under 35 U.S.C. 154(b) by 0 days.

(21) Appl. No.: 10/472,165

(22) PCT Filed: Mar. 7, 2002

(86) PCT No.: PCT/EP02/02495

§ 371 (c)(1),
(2), (4) Date: Sep. 19, 2003

(87) PCT Pub. No.: WO02/079697

PCT Pub. Date: Oct. 10, 2002

(65) Prior Publication Data

US 2004/0114916 A1 Jun. 17, 2004

(30) Foreign Application Priority Data

Mar. 29, 2001 (EP) .............................................. 01108005

(51) Int. Cl.[7] .............................. F23C 11/00; H05B 3/26
(52) U.S. Cl. ......................... 392/307; 392/438; 165/240
(58) Field of Search .................................. 219/548, 552, 219/553, 543; 392/307, 416, 432, 435, 436, 438; 237/53, 12, 2 A, 2 B; 236/91 R, 91 D; 165/240, 241, 242, 50

(56) References Cited

U.S. PATENT DOCUMENTS

| 2,530,058 | A | * | 11/1950 | Hugh | 392/307 |
| 4,093,816 | A | * | 6/1978 | Case | 392/307 |
| 4,141,408 | A | * | 2/1979 | Garnett | 165/240 |
| 4,369,765 | A | * | 1/1983 | McDaniel | 392/307 |
| 4,550,770 | A | * | 11/1985 | Nussdorfer et al. | 165/242 |
| 5,235,667 | A | * | 8/1993 | Canfield et al. | 392/307 |
| 5,367,601 | A | * | 11/1994 | Hannabery | 392/307 |

* cited by examiner

Primary Examiner—Teresa J. Walberg
(74) Attorney, Agent, or Firm—McNair Law Firm, P.A.

(57) ABSTRACT

A first partial heating system having a first heat source with an integrated heat source heat exchanger and heat transfer devices spaced from the heat source as a radiator with heat transfer outside surfaces and flow lines and return lines between the heat source heat exchanger and the heat transfer devices containing a flowable heat transport medium. A second partial heating system having a second heat source. A heat control system with a temperature regulator and switching unit for controlling both partial heating systems for individual operation or joint operation. The second partial heating system is a radiation heating system having a radiation surface coating capable of electrical activation which is applied to the heat transfer outside surfaces of the radiator as a radiation surface of the second partial heating system.

23 Claims, 1 Drawing Sheet

SPACE HEATING SYSTEM

FIELD OF THE INVENTION

The present invention relates to a building heating system, and more particularly, to a heating system divided into a first partial heating system and a second partial heating system with a temperature regulation and switching unit for controlling the partial heating systems for individual operation or joint operation.

BACKGROUND OF THE INVENTION

Conventional building heating systems typically comprise a heating boiler, such as an oil heating boiler or a gas heating boiler, to which radiators installed in the building's rooms are connected by pipes which operate as flow lines and return lines. The heat generated in the heating boiler is transported, in one or several heating cycles, via a transport medium of hot water through the pipes to the radiators, which act as a heat transfer media for radiating heat into the corresponding rooms.

Such building heating systems require relatively large amounts of heating energy. For reasons of an economical heating operation, the reduction of pollutant emissions, and the known limited fossil fuel resources, considerable alteration has been directed to designing building heating systems that operate more efficiently.

A generally known, generic type of building heating system is made up of two partial heating systems and is often used in so-called low-energy houses. A partial heating system is designed as a basic system for providing heat during cool outside temperatures, and comprises heat sources whose caloric energy is available either entirely or nearly for free and, in particular, do not require any combustion of fossil fuels. Such heat sources can be solar modules and/or geothermal modules and/or coolers for power generators from biogas plants. Such heat sources feature integrated heat source heat exchangers through which the heat transport medium of hot water can be pumped to the radiators or, as required, to intermediate heat storage systems.

One disadvantage of such heat sources is the fact that heat there from will either be available only at specific periods of time or with great variations. For example, heat from solar energy, in an amount useful in terms of heat engineering, will be available only with sufficient solar radiation that is often non-existent when heating is needed, such as at night. Thus, the heating effect achievable with this heating system alone will regularly be insufficient, especially during relatively cold outside temperatures.

Accordingly, an additional partial heating system will therefore be required as an add-on system which is designed in accordance with the initially mentioned conventional building heating system having a heating boiler for burning fossil fuels which is connected to radiators in the room to be heated. It can be switched between the partial heating systems, or operated in parallel, with the heat energy to be transferred by means of hot water to the radiators being optionally selected to come from the individual heat sources or jointly from the heat sources. A switching unit required for joint or individual operation can be integrated into a conventional heating control system with temperature regulation to automatically perform such change-over and/or connections as a function of definable marginal conditions.

It is evident that the expenditure for setting up the above described building heating system from such combination-controlled partial heating systems is considerable since for relatively cold periods, a complete heating plant for fossil fuels must be provided combined with connections and tanks for such fossil fuels as a backup system, although the building heating system is supposed to be basically operated with alternative energies, for example with solar energy, in connection with layer heat accumulators, as required. In addition, aside from the high set-up costs for the partial heating system for fossil fuels, the required maintenance and service costs are also applicable. Due to these conditions, the set-up costs of such combined heating systems are considerable higher compared with the simple, conventional building heating system described in the beginning and the savings potentials are thus relatively low overall so that such combined heating systems are not yet generally being used despite their obvious advantage.

Furthermore, surface heating elements for the construction of a heating system are known (DE 21 51 626 A) which have an electrically conductive coating and are provided with electrical connections. Such a surface heating element is operated in the type of a resistance heating in which according to the electrical resistance of the coating and the transmitted electrical current, heat will be generated directly in the surface heating element, such heat being radiated into a building room. The operation of such electrical resistance heating installations as sole building heating installations is very expensive and thus uneconomical.

Furthermore, a heating arrangement is known (DE 19849432 Al) comprising coated surface heating elements whose coating has a specific chemical composition and which is excitable by means of a harmonic generator for the radiation of electromagnetic waves. Radiation takes place in an oscillation spectrum in the range of molecular own frequencies of the media to be heated. The heating effect is via oscillating resonances such that the surface heating elements remain essentially cool and the heating effect appears directly on the media located within the radiation area. Such a heating system can be manufactured at low cost and has a high efficiency.

Accordingly, it is an object of the present invention to further develop a building heating system from a first partial heating system and a second partial heating system such that low cost manufacture and installation will be possible with little space requirement and high functionality and variability.

SUMMARY OF THE INVENTION

The above objectives are accomplished according to the present invention by providing a building heating system that includes a first partial heating system having at least one first heat source with an integrated heat source heat exchanger, and a heat transfer device installed in at least one building room remote from the heat source and having a heat transfer outside surface. A plurality of conduits provide flow lines and return lines carrying a flowable heat transport medium between the heat source, the source heat exchanger, and the heat transfer device. A second partial heating system is provided which includes a second heat source. The second heat source includes an electrically activated coating applied to at least a part of the heat transfer outside surface of the heat transfer device to provide a radiation surface for radiation heating. A heating control system having at least one temperature regulator and a switching unit is operatively associated with the first and second partial heating systems for individual and joint operation of the partial heating systems. As a result, the heat transfer device is a component of the first partial heating system as well as an integral carrier of the coating of the second partial heating system.

Advantageously, the first partial heating system operates as the primary heat provider for heating a room, and the second partial heating system can be automatically activated through the switching unit, as a function of an outside temperature and/or an inside room temperature when heat output of the first partial heating system is no longer sufficient to maintain a selected room temperature.

Preferably, the first heat source is selected from one of a solar module, a geothermal module, a cooler of a power generator of a biogas, and any combination thereof. Preferably, the heat transport medium comprises a controlled pumpable hot water. However, the arrangement according to the invention can also be designed for hot air heating. For a further reduction of the energy costs of the building heating system, the electrical energy for the second partial heating system can also be provided or at least supplemented, as the case may be, via alternative energy generating equipment, such as one of a solar module, a wind power generator, a biogas power generator, and a hydroelectric generator, and any combination thereof.

In a preferred embodiment, the heat transfer device is a flat radiator with a generally planar front surface. The flat radiator is capable of installation on a generally parallel surface of a room wall with the front surface facing into the room, and the coating applied on the front surface for radiating heat. On such heat transfer media, the coating can be applied flatly and simply, over a large area, and with a good function result according to the present invention.

Usually, heat exchangers are cast from metal or formed from sheet metal. It will then be essential that an electrically insulating intermediate layer will be applied between the heat exchanger outside surface as the carrier surface and the coating. This intermediate layer can also be a coating, for example a color coating, or it can be designed as an adhesive film which, in turn, presents a carrier surface for the coating as a radiation surface. In a preferred embodiment, the heat transfer device is made of metal and at least one electrically insulating intermediate layer is provided between the heat transfer outside surface and the coating applied as the radiation surface.

In a particularly advantageous embodiment, the coating is limited by two electrical conductors connected to the coating and the coating is composed of (a) 55% to 65% amount of substance of a basic substance comprising (1) 39% to 49% amount of substance binding agent, (2) 18% to 23% amount of substance insulator, (3) 18% to 24% amount of substance dispersing agent, and (4) 12% to 16% amount of substance distilled water, and, (b) 35% to 45% amount of substance graphite.

Preferably, the binding agent of the coating is composed of (1) 64% to 79% amount of substance distilled water, (2) 4% to 6% amount of substance sulfonated oil, (3) 0.16% to 0.24% amount of substance phenols or 0.05 to 0.5% amount of substance benzisothiazolinone, (4) 15% to 19% amount of substance casein, (5) 0.8% to 1.2% amount of substance urea, (6) 2% to 3% amount of substance alkaline thinning agent, and (7) 2.5% to 3.5% amount of substance caprolactam.

In a preferred embodiment, the heating control comprises a harmonic generator having an electrical component including, with a control oscillation, a steep current increase speed in accordance with a steep increase edge and thus being suitable for generating a high harmonic percentage. The harmonic generator is coupled to the coating by two electrical conductors for excitation of the coating for radiating electromagnetic waves with an oscillation spectrum in the frequency range of molecular self-oscillations.

Preferably, the sulfonated oil of the binding agent is sulfated ricinus oil, the phenols of the binding agent are carbonized phenols produced by cracking, and the thinning agent of the binding agent is a solvent based in a group consisting of aromatics, alcohols, esters, ketones, and any combination thereof, and the insulator of the coating is insulating soot. Additionally, the dispersing agent of the coating is selected from the group consisting of inorganic or organic monomer and polymer substances. Preferably, the coating material contains a thixotropic agent.

In a preferred embodiment, the electrical component is one of a Triac and/or a double MOSFET, and the electrical conductors are designed generally as parallel aligned copper foil strips connected to the coating in a capacitive and/or inductive coupling manner, with the coating being under or above the copper foil strips or embedded in the coating. The coating is controllable and adjustable by changing the amplitudes and frequency, selectively, of the oscillations of the harmonic generator.

Accordingly, the second partial heating system requires neither an expensive heating boiler with burner, an oil tank, nor the rooms, the piping connections and controls required for it. Due to the integral arrangement of radiation surfaces on the heat transfer device of the first partial heating system, no additional space is needed for the second partial heating system in the rooms to be heated. The heat transfer device thus has a double function as a conventional heat transfer media for the first partial heating system and simultaneously as a carrier element for the radiation surfaces of the second partial heating system. Due to this integrated double function, the heat transfer device/radiation surface combination can be advantageously prefabricated as one structural component as a module at a manufacturer. Then, the installation for setting up the building heating system of the two integrated room heating source elements of heat transfer device and radiant surface coating is advantageously performed in only one operation. This will result in low costs for manufacture and installation of the heating system.

The above building heating system is perfectly suitable as a low-energy heating system with the first partial heating system being designed as a basic system for heating conditions at cool outside temperatures and the second partial heating system being added on, with radiant surfaces capable of electrical activation through the control unit at relatively cold outside temperatures at which the heat output of the first partial heating system alone is no longer sufficient. This addition should preferably be triggered automatically and can take place as a function of an outside temperature and/or inside room temperature, possibly even in combination with a determined temperature progression.

Advantageously, this type of coating generally remains cool during the heating operation and will generate heating effects through resonances in the medium to be heated, by excitation of molecular self-oscillations. These heating effects and heating arrangements are excellently suitable as a backup system in the further development according to the invention and its combination to a low-energy heating system.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

DETAILED DESCRIPTION OF A PREFERRED EMBODIMENT

Figure 1:
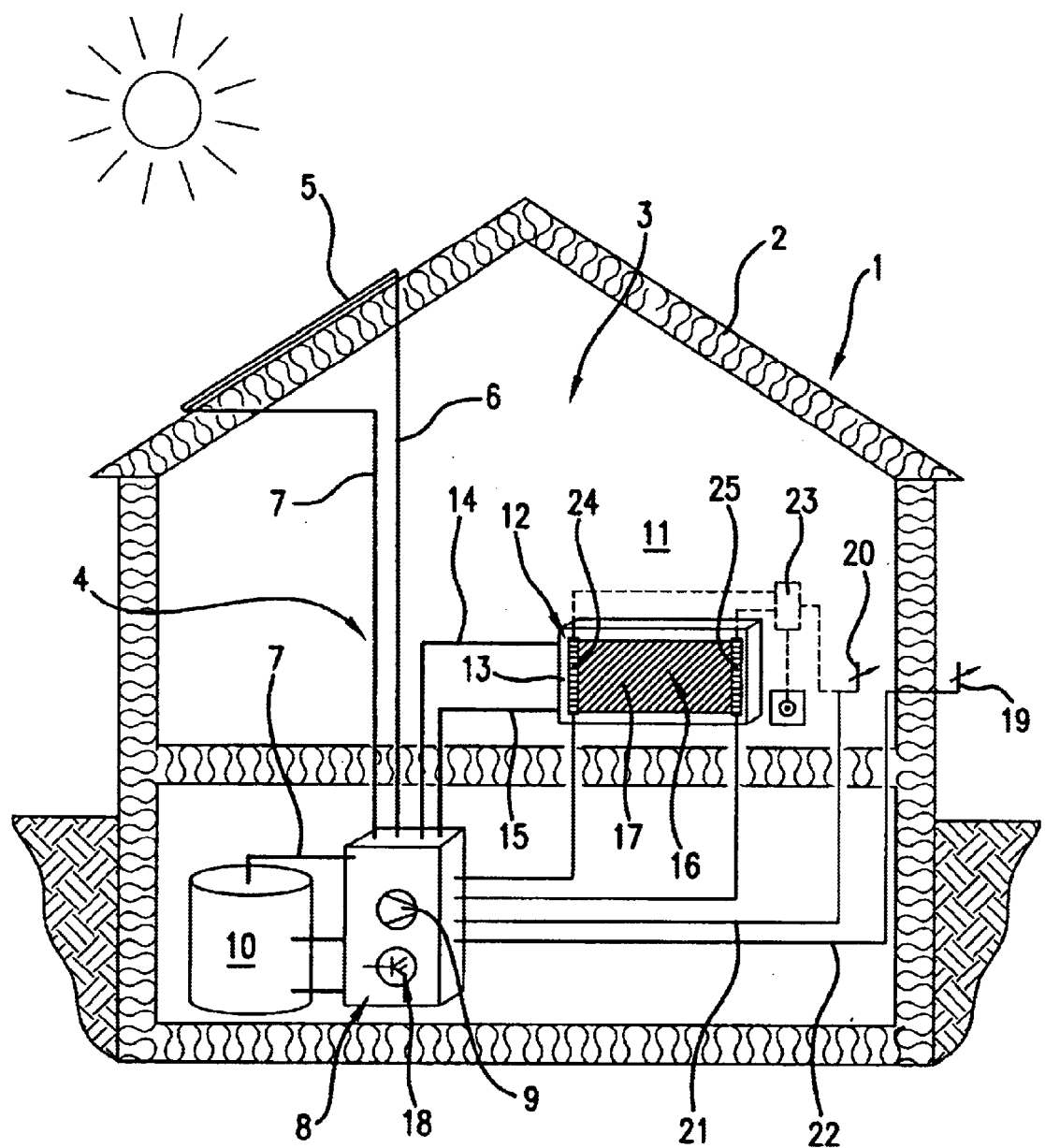
FIG. 1 shows a schematic cross-section through a building of the heating system according to the present invention.

With reference to the drawings, the invention will now be described in more detail. Referring to FIG. 1, a building, designated generally as 1, represents a low-energy house which is here provided with a heat insulation 2 and a low-energy heating system, designated generally as 3. This low-energy heating system consists of a first partial heating system 4 which has, as a heat source, a solar module 5 here selected by way of example. This solar module is coupled via pipe conduits 6 and 7 to a regulation and control system 8, which has a pump arrangement 9 with several pumps, with one of the pumps of pump arrangement 9 pumping cold water via pipe 6 to the solar module 5 where it is heated and subsequently directed as hot water via pipe 7 into a hot water layered heat storage system 10.

The first partial heating system 4 furthermore comprises at least one heat transfer device installed in a building room 11. In a preferred embodiment, the heat transfer device is a flat radiator 12 which is presented in FIG. 1 by way of example and schematically shown, and which has a generally planar front surface 13 and is installed approximately parallel in or on a room wall, with front surface 13 facing into building room 11.

With intermediate switching of control and regulating system 8, flat radiator 12 is connected with hot water layered heat storage tank 10 via a flow line 14 and a return line 15. If necessary, via flow line 14, hot water can be pumped into flat radiator 12 by means of at least one additional pump of pump arrangement 9 to heat building room 11 by giving off heat to the ambient air through flat radiator 12. The correspondingly cooled down water is then passed back via return line 15 for reheating. Accordingly, heat storage tank 10 operates as a heat source heat exchanger by transferring, via the flow lines and pumps, hot water from heat source 5 to flat radiator 12 and then directing the cooled heat transfer medium, typically water, for reheating. This first partial heating system 4 thus forms the basic system for heat output when heat is required.

Moreover, low-energy heating system 3 also comprises a second partial heating system having a second heat source. The second heat source is designed generally as radiation heating 16. Radiation heating 16 is provided by a coating applied evenly onto front surface 13 of flat radiator 12. The coating is capable of electrical activation to produce a radiation surface 17 for heating a medium. In a preferred embodiment, flat radiator 12 is made of metal and at least one electrically insulating intermediate layer, not shown, is provided between the heat transfer outside surface of flat radiator 12 and the coating applied to the radiator as radiation surface 17.

In a preferred embodiment, the coating is composed of (a) 55% to 65% amount of substance of a basic substance comprising (1) 39% to 49% amount of substance binding agent, (2) 18% to 23% amount of substance insulator, (3) 18% to 24% amount of substance dispersing agent, and (4) 12% to 16% amount of substance distilled water, and, (b) 35% to 45% amount of substance graphite.

Preferably, the binding agent of the coating is composed of (1) 64% to 79% amount of substance distilled water, (2) 4% to 6% amount of substance sulfonated oil, (3) 0.16% to 0.24% amount of substance phenols or 0.05 to 0.5% amount of substance benzisothiazolinone, (4) 15% to 19% amount of substance casein, (5) 0.8% to 1.2% amount of substance urea, (6) 2% to 3% amount of substance alkaline thinning agent, and (7) 2.5% to 3.5% amount of substance caprolactam.

Furthermore, a heating control 18 is included in control and regulation system 8. Heating control 18 includes a temperature regulator system and a switching unit for switching off or changing over the partial heating systems 4 and 16 for individual operation, or for the addition of one of the partial heating system to the other partial heating system for joint operation. Heating control 18 is preferably integrated into control and regulation system 8 and is coupled to an outside temperature sensor 19, as well as an inside temperature sensor 20 via corresponding lines 21 and 22.

Heating control 18 moreover comprises a harmonic generator 23, which comprises e.g. a Triac and/or a double MOSFET as the electrical module which has, at an approach oscillation, a steep current increase speed corresponding to a steep rising edge and thus being suitable for generating a high harmonic percentage.

Harmonic generator 23 is coupled to radiation surface 17 through two electrical conductors, preferably formed by copper foil strips 24 and 25 which are generally aligned in parallel at opposite ends of radiation surface 17. Excitation of radiation surface 17 is achievable for radiating electromagnetic waves with an oscillation spectrum in the frequency range of molecular self-oscillations, with the heating effect of radiation surface 17 being controllable and/or adjustable through a change of the amplitudes and/or the frequency of triggering oscillations of the harmonic generator 23.

The second partial heating system designed as radiation heating 16 can be added, automatically through the switching unit included in heating control 18, as a function of an outside temperature and/or an inside temperature, such as when at relatively cold outside temperatures the heating output of the first partial heating system 4 is no longer sufficient for maintaining a desired temperature.

The electrical contact to radiation surface 17 is designed as a capacitive and/or inductive coupling with the coating of radiation surface 17 being under or over the copper foil strips 24 and 25, or these are embedded alternatively into radiation surface 17.

Furthermore, low-energy heating system 3 can be attributed with one of solar module 5, a wind power generator, a biogas power generator, and a hydropower generator and any combination thereof, for generating the electrical energy for radiation heating 16.

While a preferred embodiment of the invention has been described using specific terms, such description is for illustrative purposes only, and it is to be understood that changes and variations may be made without departing from the spirit or scope of the following claims.

What is claimed is:

1. A building heating system comprising:
   - a first partial heating system for heating the interior of a room;
   - said first partial heating system including at least one first heat source, a heat source heat exchanger, and a heat transfer device installed in at least one building room remote from the heat source and having a heat transfer outside surface;
   - a plurality of conduits providing flow lines and return lines carrying a flowable heat transport medium between the heat source, heat source heat exchanger and the heat transfer device;
   - a second partial heating system having a second heat source for heating the interior of a room;

said second heat source including an electrically activated coating applied to at least a part of the heat transfer outside surface of the heat transfer device to provide a radiation surface for radiation heating; and, a heating control system having at least one temperature regulator and a switching unit operatively associated with said first and second partial heating systems for individual and joint operation of the partial heating systems;

whereby the heat transfer device is a component of the first partial heating system as well as an integral carrier of the coating of the second partial heating system.

2. The heating system of claim 1 wherein the first partial heating system operates as the primary heat provider for heating a room, and the second partial heating system can be automatically activated through the switching unit, as a function of an outside temperature and/or an inside room temperature when heat output of the first partial heating system is no longer sufficient to maintain a selected room temperature.

3. The heating system of claim 1 wherein said first heat source includes one of a solar module, a geothermal module, a cooler of a power generator of a biogas, and any combination thereof.

4. The heating system of claim 1 wherein said heat transport medium comprises a controlled pumpable hot water.

5. The heating system of claim 1 including one of a solar module, wind power generator, a biogas power generator, and a hydroelectric generator for generating electrical energy for the second partial heating system.

6. The heating system of claim 1 wherein said heat transfer device is a flat radiator with a generally planar front surface; said flat radiator capable of installation on a generally parallel surface of a room wall with the front surface facing into the room, and the coating applied on said front surface for radiating heat.

7. The heating system of claim 1 wherein the heat transfer device is made of metal and at least one electrically insulating intermediate layer is provided between the heat transfer outside surface and the coating applied as the radiation surface.

8. The heating system of claim 1 wherein the electrically activated coating includes:

a. 55% to 65% amount of substance of a basic substance comprising
  39% to 49% amount of substance binding agent,
  18% to 23% amount of substance insulator,
  18% to 24% amount of substance dispersing agent, and
  12% to 16% amount of substance distilled water,
and,
b. 35% to 45% amount of substance graphite.

9. The heating system of claim 8 wherein the insulator of the coating is insulating soot.

10. The heating system of claim 8 wherein the dispersing agent of the coating is selected from the group consisting of inorganic or organic monomer and polymer substances.

11. The heating system of claim 8 wherein the coating material contains a thixotropic agent.

12. The heating system of claim 8 wherein the binding agent of the coating includes:
  64% to 79% amount of substance distilled water,
  4% to 6% amount of substance sulfonated oil,
  0.16% to 0.24% amount of substance phenols or 0.05 to 0.5% amount of substance benzisothiazolinone,
  15% to 19% amount of substance casein,
  0.8% to 1.2% amount of substance urea,
  2% to 3% amount of substance alkaline thinning agent, and
  2.5% to 3.5% amount of substance caprolactam.

13. The heating system of claim 12 wherein the sulfonated oil of the binding agent is preferably sulfated ricinus oil, the phenols of the binding agent are carbonized phenols produced by cracking, and the thinning agent of the binding agent is a solvent based in a group consisting of aromatics, alcohols, esters, ketones, and any combination thereof.

14. The heating system of claim 1 wherein said heating control system comprises a harmonic generator having an electrical component including, with a control oscillation, a steep current increase speed in accordance with a steep increase edge and thus being suitable for generating a high harmonic percentage; said harmonic generator coupled to the coating by two electrical conductors for excitation of the coating for radiating electromagnetic waves with an oscillation spectrum in the frequency range of molecular self-oscillations.

15. The heating system of claim 14 wherein the electrical component is one of a Triac or a double MOSFET, and the electrical conductors are designed generally as parallel aligned copper foil strips connected to the coating in a capacitive and/or inductive coupling manner, with the coating being under or above the copper foil strips or embedded in the coating.

16. The heating system of claim 15 wherein the heating effect of the coating is controllable and adjustable by changing the amplitudes and frequency, selectively, of the oscillations of the harmonic generator.

17. A building heating system comprising:

a first partial heating system including a first heat source operatively associated with a heat transfer device having a heat transfer outside surface for radiating heat provided by the heat source;

a second partial heating system including an electrically activated coating carried by said heat transfer outside surface of said heat transfer device to provide a radiation surface for radiation heating to supplement the heating of said first partial heating system; and, a heating control system operatively associated with said first and second partial heating systems for individual and joint operation of said first and second partial heating systems;

whereby the heat transfer device is a component of the first partial heating system as well as an integral carrier of the coating of the second partial heating system.

18. The heating system of claim 17 wherein said heat transfer device is made of metal and at least one electrically insulating intermediate layer is provided between the heat transfer outside surface and said coating applied as the radiation surface.

19. The heating system of claim 17 wherein the electrically activated coating includes:

a. 55% to 65% amount of substance of a basic substance comprising
  39% to 49% amount of substance binding agent,
  18% to 23% amount of substance insulator,
  18% to 24% amount of substance dispersing agent, and
  12% to 16% amount of substance distilled water,
and,
b. 35% to 45% amount of substance graphite.

20. The heating system of claim 17 wherein said heating control system comprises a harmonic generator having an electrical component including, with a control oscillation, a steep current increase speed in accordance with a steep increase edge and thus being suitable for generating a high harmonic percentage; said harmonic generator coupled to the coating by two electrical conductors for excitation of the coating for radiating electromagnetic waves with an oscillation spectrum in the frequency range of molecular self-oscillations.

21. A building heating system comprising:

a first partial, heating system including a heat transfer device for radiating heat provided by a heat source;

a second partial heating system including an electrically activated coating carried by said heat transfer device and providing a radiation surface for radiation heating;

said electrically activated coating including, a.) 55% to 65% amount of substance of a basic substance comprising:
- 39% to 49% amount of substance binding agent,
- 18% to 23% amount of substance insulator,
- 18% to 24% amount of substance dispersing agent, and
- 12% to 16% amount of substance distilled water, and, b.) 35% to 45% amount of substance graphite; and, a heating control system operatively associated with said first and second partial heating systems for individual and joint operation of said first and second partial heating systems; whereby the heat transfer device is a component of the first partial heating system as well as an integral carrier of the coating of the second partial heating system.

22. The heating system of claim 21 wherein said heat transfer device is made of metal and at least one electrically insulating intermediate layer is provided between the heat transfer device and said coating applied as the radiation surface.

23. The heating system of claim 21 wherein said heating control system comprises a harmonic generator having an electrical component including, with a control oscillation, a steep current increase speed in accordance with a steep increase edge and thus being suitable for generating a high harmonic percentage; said harmonic generator coupled to the coating by two electrical conductors for excitation of the coating for radiating electromagnetic waves with an oscillation spectrum in the frequency range of molecular self-oscillations.

* * * * *